(12) United States Patent
Lawson et al.

(10) Patent No.: US 9,036,376 B2
(45) Date of Patent: May 19, 2015

(54) SWITCHED-MODE COMPOUND POWER CONVERTER WITH MAIN AND SUPPLEMENTAL REGULATORS

(71) Applicant: CogniPower, LLC, Malvern, PA (US)

(72) Inventors: Thomas E. Lawson, Malvern, PA (US); William H. Morong, Paoli, PA (US)

(73) Assignee: CogniPower, LLC, Malvern, PA (US)

( * ) Notice: Subject to any disclaimer, the term of this patent is extended or adjusted under 35 U.S.C. 154(b) by 0 days.

(21) Appl. No.: 14/347,722

(22) PCT Filed: Nov. 12, 2012

(86) PCT No.: PCT/US2012/064617
§ 371 (c)(1),
(2) Date: Mar. 27, 2014

(87) PCT Pub. No.: WO2013/074433
PCT Pub. Date: May 23, 2013

(65) Prior Publication Data
US 2014/0232366 A1    Aug. 21, 2014

Related U.S. Application Data

(60) Provisional application No. 61/559,397, filed on Nov. 14, 2011.

(51) Int. Cl.
| | | |
|---|---|---|
| H02J 1/10 | (2006.01) | |
| H02M 3/158 | (2006.01) | |
| H02J 3/32 | (2006.01) | |
| H02M 3/156 | (2006.01) | |

(52) U.S. Cl.
CPC ............... *H02M 3/1584* (2013.01); *H02J 3/32* (2013.01); *H02M 2003/1566* (2013.01)

(58) Field of Classification Search
USPC ............ 323/266, 267, 268; 363/21.04, 21.06, 363/21.09, 21.1, 21.12, 21.14, 21.17, 21.18, 363/65, 86, 97
See application file for complete search history.

(56) References Cited

U.S. PATENT DOCUMENTS

| | | | | |
|---|---|---|---|---|
| 6,504,497 | B2 * | 1/2003 | Jang et al. | 341/125 |
| 6,545,883 | B2 * | 4/2003 | Xing et al. | 363/21.11 |
| 7,061,212 | B2 * | 6/2006 | Phadke | 323/222 |

(Continued)

FOREIGN PATENT DOCUMENTS

WO        WO2008009025 A2      1/2008

OTHER PUBLICATIONS

International Search Report and Written Opinion; Mailed Oct. 17, 2013 for the corresponding PCT Application No. PCT/US2012/064617.

*Primary Examiner* — Jue Zhang
*Assistant Examiner* — Lakaisha Jackson
(74) *Attorney, Agent, or Firm* — Mendelsohn, Drucker & Dunleavy, P.C.; Steve Mendelsohn

(57) ABSTRACT

In certain embodiments, the present invention provides a compound power converter in which the majority of power passes from input to output through only a single stage of power conversion. At least one embodiment includes a main converter with an auxiliary output. The auxiliary output energizes a reservoir that provides input power for a supplemental converter capable supplying the main output. The supplemental converter improves regulation and can provide holdover power for Power Factor Correction (PFC) or Uninterruptible Power Supply (UPS) operation.

34 Claims, 13 Drawing Sheets

(56) References Cited

U.S. PATENT DOCUMENTS

| | | |
|---|---|---|
| 7,436,159 B1 | 10/2008 | Wochele |
| 7,978,483 B2 * | 7/2011 | Mazzola et al. ............... 363/17 |
| 8,344,638 B2 * | 1/2013 | Shteynberg et al. ......... 315/247 |
| 8,467,199 B2 * | 6/2013 | Lee et al. ................. 363/21.02 |
| 8,665,613 B2 * | 3/2014 | Degen et al. ................ 363/21.1 |
| 2010/0014330 A1 * | 1/2010 | Chang et al. ................... 363/89 |
| 2010/0039080 A1 * | 2/2010 | Schoenbauer et al. ........ 323/234 |
| 2010/0265628 A1 | 10/2010 | Blinder et al. |

* cited by examiner

SWITCHED-MODE COMPOUND POWER CONVERTER WITH MAIN AND SUPPLEMENTAL REGULATORS

CROSS-REFERENCE TO RELATED APPLICATIONS

This application claims the benefit of the filing date of U.S. provisional application No. 61/559,397, filed on Nov. 14, 2011, the teachings of which are incorporated herein by reference in their entirety.

BACKGROUND

Regulation of switched mode power converters is complicated by the phase shift implicit in an output filter. More filtration improves regulation under steady state conditions, but causes more delay in the feedback path. That delay complicates regulation under dynamic conditions. The performance of Pulse Width Modulated (PWM) converters is therefore a compromise between agility and stability. Morong et al. (U.S. Pat. Nos. 7,642,758 B2 and 7,965,064 B2) provide improved dynamic performance over PWM through prediction, but a real-time calculation burden is imposed.

One other technique to improve regulation is to load extra energy into the switched inductor. Bordillion (U.S. Pat. No. 6,552,917 B1) suggests energizing to an excess inductive current and recovering that excess energy on the primary side of the power converter at the end of each chopping cycle. That approach helps to solve the regulation problem, but incurs inefficiency because a portion of the inductive energy moves from primary to secondary, and then from secondary to primary to storage, without performing useful work.

Re-regulation is another approach. Placing a second, cascaded regulator after the first converter will surely improve regulation, but a second stage of power conversion may double the losses. A linear regulator can be employed, but reduced efficiency cannot be avoided. Others have proposed adding an auxiliary power supply to a flyback converter, including Webb et al. (U.S. Pat. No. 6,775,159 B2). The auxiliary supplies proposed are intended to power other circuitry, or to help produce the voltages needed for driving various power switches.

Most power converters with power factor correction (PFC) use a line filter followed by a diode bridge. These systems all incur diode losses in the bridge. A bridgeless, inductive, resonant approach is described by Cuk in U.S. Patent Application 2010/0259240 A1. Large inductors are needed to resonate at line frequencies. These converters have heretofore proven difficult in practice, so topologies using capacitive storage instead of inductive storage are seen as more desirable.

A preferred approach for higher power and higher efficiency PFC employs an active bridge, where two of the rectifier diodes are replaced by switches commutated at a frequency much higher than line frequency, allowing much smaller inductors. The active bridge has the advantage of removing one diode, and the associated diode drop, from the current path. Two diodes are eliminated if bipolar blocking switches are employed. For these reasons, active bridge systems have an advantage for performing PFC at high efficiency.

Conventionally, active bridge systems use a flyback stage regulated to perform PFC, producing an intermediate voltage of hundreds of volts stored in a capacitor. The stored energy is then down-converted using a buck converter to produce a regulated output. In such a system, all the power moves through the two cascaded conversion stages.

Several inventors have proposed a means of storing energy in a capacitor on the AC side of the isolation barrier. For example, in U.S. Pat. Nos. 6,952,354 and 7,061,776, Yang et al. propose adding an additional switch, an inductor, and three additional diodes to control the movement of power into and out of a storage capacitor in a single-stage topology. In addition to the extra complexity, all the power converted must traverse an extra semiconductor junction and the stored energy must pass through the extra inductor. In U.S. Patent Application No. 2004/0156217 A1, Phadke proposes adding an extra transformer winding, two diodes, and two extra switches in addition to the storage capacitor. Sufficient energy can then be stored in the capacitor to regulate the output voltage, but the storage voltage interacts with the AC line voltage to complicate the PFC control function. Also, since the flyback energy is divided between the output and the storage function, a mechanism must be provided to prevent the storage function from degrading the output regulation. Greater complexity or poor output regulation is the result. Others propose adding a second stage for re-regulation to address these shortcomings, but in so doing, defeat the purpose of building a regulated single-stage PFC controller.

There are examples in the prior art of single-inductor, multiple-output, switched-mode power converters. Li (U.S. Pat. No. 6,075,295), Caine (U.S. Pat. No. 4,847,742), and Gorder et al. (U.S. Pat. No. 5,617,015) describe controls to exactly balance the inductor energy loaded during the energize portion of the chopping cycle with the aggregate demand of the outputs. A limitation of non-predictive flyback or forward converters is that the energize termination is based on past or present conditions, but the energy transfer outcome depends on future conditions. That fact fundamentally limits regulation. The existence of multiple output voltages makes this form of regulation even more challenging. In addition, none of these multiple-output power converters have the capability to perform PFC.

Zero current switching is described by Vinciarelli in U.S. Pat. No. 4,415,959. Zero current switching is achieved by moving energy in discrete, quasi-resonant quanta.

SUMMARY

Certain embodiments of the present invention provide a switched-mode power converter comprising a main converter that powers an output and also powers an energy-storage element. According to these embodiments, energy from the energy-storage element also powers the converter output through a supplemental converter or regulator, responsive to control circuitry. This form of power converter is here referred to as a compound converter.

The energy-storage element may comprise a capacitor, a super capacitor, a battery, an inertial storage device, or another form of energy storage device. Note that a super capacitor is a particular type of capacitor.

Energy from the storage device may be used to power the converter output when input power to the converter is interrupted, or to meet peak power demands, or to reduce ripple.

The converter of certain embodiments of this invention may be powered from a DC or a rectified AC source. Energy from the storage element may be used to facilitate PFC when an embodiment of this invention is powered by an AC source.

The converter of certain embodiments of the present invention may also comprise circuitry to provide multiple voltages, or oppositely polled voltages at the output, or to provide an AC output at a variable frequency.

DETAILED DESCRIPTION

Figure 1:
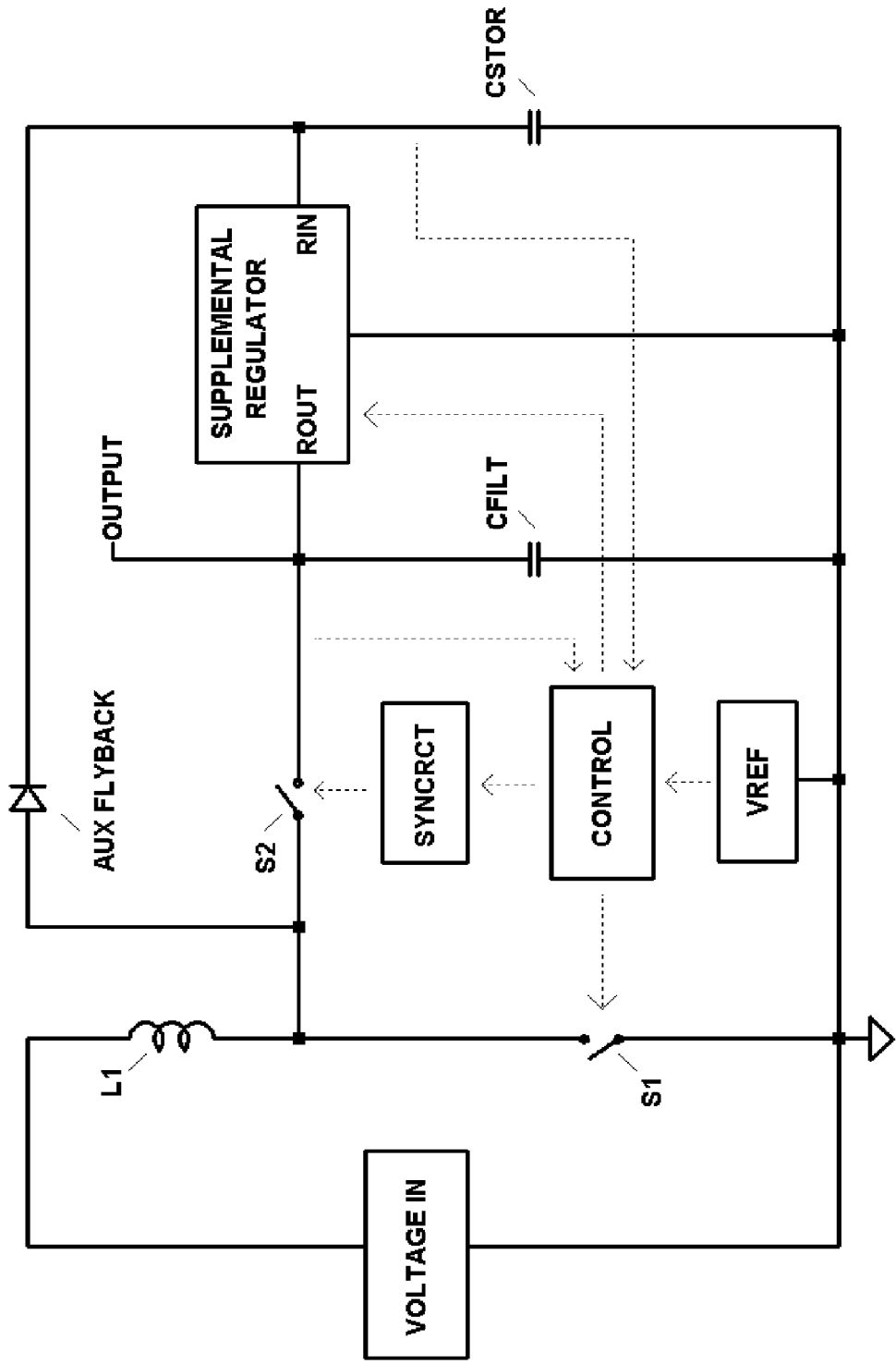
FIG. 1 illustrates one embodiment of the inventive compound power converter.

In one embodiment, the invention comprises a main switched mode power converter that passes the majority of the power and a subordinate converter that provides supplementary power, when needed. The source of supplemental energy is a second output voltage. The second voltage is held in a storage capacitor, usually charged to a voltage higher than the output voltage by an auxiliary path which includes a diode or switch. Disabling the main converter rectifier at the point of output regulation causes inductive energy to pass through the diode or switch into the storage reservoir. In this topology, a mechanism for regulating the main output is also the mechanism for generating the auxiliary output voltage.

The supplemental converter can be of any sort, including linear. The supplemental converter can then provide additional power, if needed, by moving energy from the storage capacitor to the output. Given the overriding control of the main synchronous rectifier and an alternate destination for excess inductive energy, it is not necessary to precisely meter the energy placed in the switched inductor during the energize portion of the switching cycle in order to achieve excellent regulation. The main converter regulation is local and immediate.

When the supplemental converter is a buck converter, the additional components may be an inductor, a diode, and a switch with control. The frequency of operation can be independent of the main flyback converter, or can be synchronous. The supplemental regulator can regulate to a slightly lower point than the main flyback converter. Control of the energize time will keep the reservoir voltage within bounds. The energize time control can be slow and approximate, because an exact reservoir voltage is not required, and the reservoir voltage can, by nature, change only slowly. The control for the supplemental buck converter can be energizing until the output reaches a set point, or the control can be based on predictive energy balancing for best regulation.

The compound structure of certain embodiments of the present invention may appear to add complexity, but in practice it can allow a reduction in size, cost, and parts count, in addition to improving efficiency. One embodiment, a power adapter with PFC, illustrates how a compound converter can replace cascaded converters to good advantage.

A conventional AC-DC power adapter with Power Factor Correction (PFC) comprises a flyback converter followed by a buck converter. In that topology, the power passes through two stages of conversion in series, each with commensurate losses. In a compound converter, the majority of energy is moved only once, through the flyback path. In one embodiment, a transformer used in the flyback mode provides the isolation barrier for the AC line. This embodiment employs an active bridge for high efficiency. To minimize the number of power switching elements, the active bridge directly energizes one of two primary windings on the flyback transformer. The two polarities of input current are detected and routed to the correctly polarized primary winding. Note that the same result could be achieved in a variety of functionally equivalent mechanisms, including a split secondary winding or by employing extra switches to steer currents appropriately to or from a single winding. In one embodiment, a nearly constant on-time control guarantees that the current and voltage at the AC input stay in phase. The on-time control is filtered so that the on-time cannot change substantially during a single AC cycle, but can provide the appropriate on-time after a number of AC cycles. Because the commutation period is very short compared to the AC line period, a small inductive line input filter may be used to average the input current. On the isolated side, energy is transferred first to the load until the regulation point is reached, and then to a storage capacitor, if extra inductive energy remains. Whenever the regulation point is not reached, there is no excess inductive energy, so the storage capacitor is not charged.

A supplemental buck converter can operate in synchrony, or totally independently. It can regulate the DC output to a voltage that may be an amount lower than the flyback regulation voltage. If the DC output falls below the buck regulation point, then the buck converter will supply energy to the output. In this fashion, a majority of the energy can pass directly from the input to the output through a single flyback stage of power conversion. Energy transferred by that stage passes through a minimum number of semiconductors and dissipative components for higher efficiency. During the portion of the AC cycle when not enough energy can be transferred by the flyback converter, the supplemental buck converter provides the energy shortfall. Energy provided by the buck converter has passed through two stages of power conversion, so greater losses are incurred. Nonetheless, most of the energy can pass directly from input to output through the flyback stage alone.

The buck converter can be used to minimize ripple or to improve regulation. The supplemental buck converter can be adaptively controlled to maximize efficiency by providing holdover power only when needed, or can be controlled to minimize ripple. In an Uninterruptible Power Supply (UPS) application, only the buck converter would deliver power when operating from the back-up DC power source.

This design has been tested in SPICE. The graphs of voltage and current presented were generated by SPICE.

FIG. 1 shows a compound power converter according to one embodiment of this invention. Inductor L1 is energized from power source VOLTAGE IN when circuitry of control block CONTROL closes switch S1. CONTROL block enables synchronous rectifier SYNCRCT which closes switch S2 while energy is available until the output reaches the regulation point. Capacitor CFILT filters the flyback OUTPUT. Whenever the regulation point is reached, switch S2 opens and inductor L1 flies back so that diode AUX FLYBACK becomes forward biased and augments the energy in capacitor CSTOR. CONTROL block maintains a substantially constant ON time for switch S1. That ON time is slowly modulated by the voltage on capacitor CSTOR to keep the storage voltage within bounds. The SUPPLEMENTAL REGULATOR can be of any sort. The SUPPLEMENTAL REGULATOR is powered from regulator input RIN. It can supply the OUTPUT through regulator output ROUT should the flyback path fail to do so. The SUPPLEMENTAL REGULATOR requires a minimum load to allow CONTROL block to keep CSTOR from rising above the upper limit. The relative contributions of the flyback path and the SUPPLEMENTAL REGULATOR can be adjusted by the CONTROL block through setting their relative regulation points. If the SUPPLEMENTAL REGULATOR turns on near the trough of the OUTPUT ripple, then it will contribute a small percentage of the total power. If the SUPPLEMENTAL REGULATOR turns on near the peak of the OUTPUT ripple, then it will contribute a larger percentage of the total power to the OUTPUT. The synchronous rectifier, SYNCRCT, can be omitted should a diode be placed in series with switch S2 to provide rectification.

For the circuit in FIG. 1, VOLTAGE IN cannot exceed the voltage at CSTOR for proper operation. If the capacity of CSTOR is large, then current-limiting of VOLTAGE IN may be needed.

Figure 2:
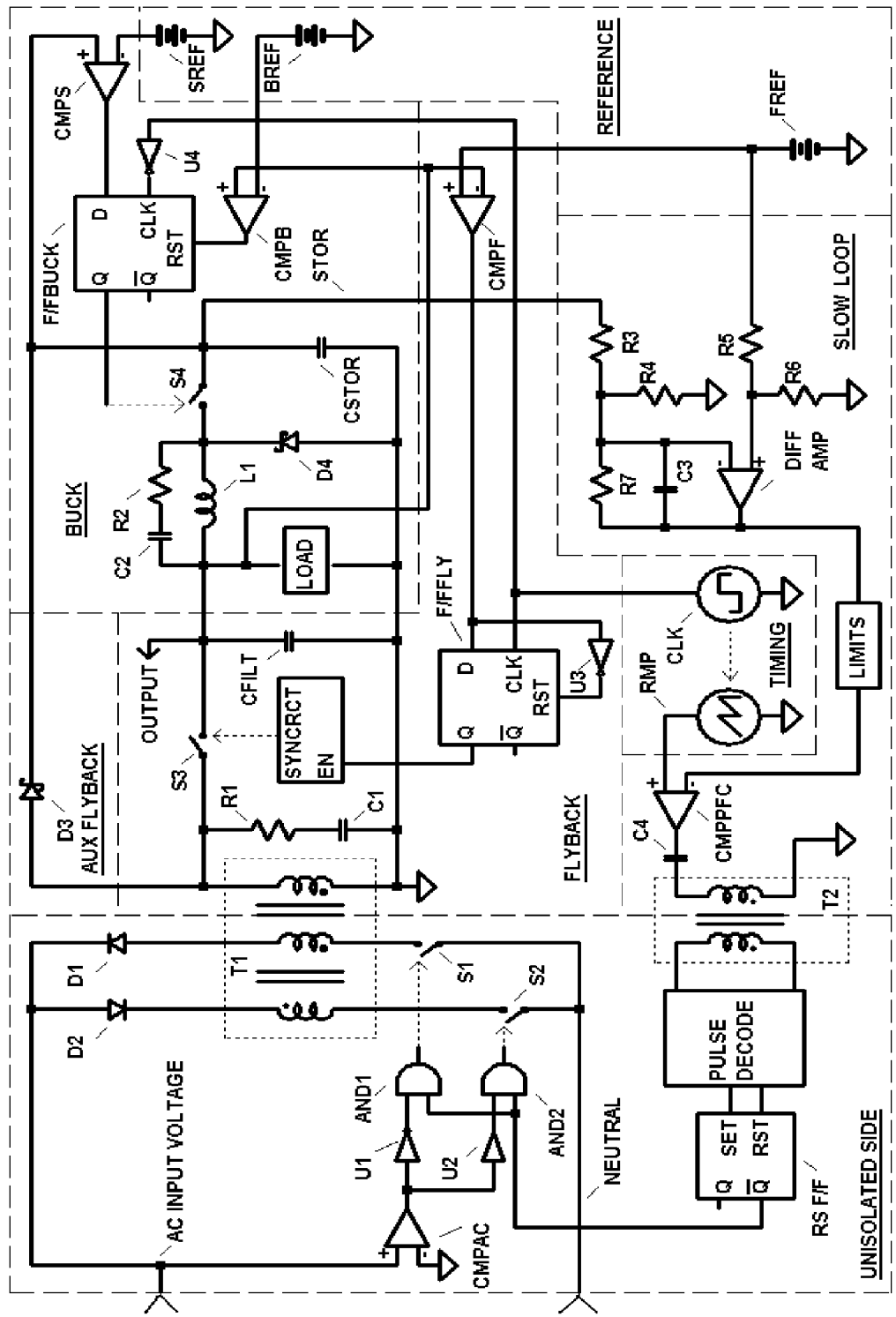
FIG. 2 illustrates one embodiment of a PFC power adapter using a compound converter.

FIG. 2 shows one embodiment of the present invention. The circuitry on the unisolated side of the isolation barrier relates to the NEUTRAL connection on the AC line. The energize portion of the flyback conversion cycle is under the control of the bistable flip-flop, RS F/F. That bistable is set and reset by circuits on the right hand side of the isolation barrier through pulse transformer T2. Note that the constant-on-time control of the unisolated circuitry does not need to be synchronous with the operation of the isolated side, though synchronization results in smoother operation.

The converter seen on the right-hand side of the isolation barrier includes a conventional flyback converter FLYBACK, utilizing a synchronous rectifier SYNCRCT, switch S3, a filter capacitor CFILT, and associated circuitry. The synchronous rectifier includes an enable input, EN, which, when set to logic 0 (i.e., disabled), causes switch S3 to be opened. When the synchronous rectifier is disabled while energy remains in the inductor T1, the flyback voltage rises to forward bias the AUX FLYBACK diode D3 through which energy is stored in capacitor CSTOR.

A more detailed explanation follows, beginning at the UNISOLATED SIDE. Comparator CMPAC responds to the polarity of the AC INPUT VOLTAGE. When the AC input voltage is negative, inverter U1 applies a logic 1 to gate AND1 so that switch S1 can be turned on, responsive to bistable RS F/F. When the AC input voltage is positive, buffer U2 applies a logic 1 to gate AND2 so that switch S2 can be turned on, responsive to bistable RS F/F. The result is that either switch S1 or switch S2 turns on when bistable RS F/F is set. The switch is selected to cause the correct polarity of current to flow in transformer T1. Transformer T1 may have a turns ratio other than one. In this example, the primary inductance is ten times the secondary inductance. Diodes D1 and D2 are needed only if switches S1 and S2 are not bipolar blocking. If, for example, bipolar blocking GaN switches were used for switches S1 and S2, diodes D1 and D2 would be omitted.

The combination of the PULSE DECODE block and bistable RS F/F serve to reconstruct the output of comparator CMPPFC as differentiated by capacitor C4, and passed to the UNISOLATED SIDE by transformer T2 at the Q output of bistable RS F/F. A negative edge at comparator CMPPFC is decoded by the PULSE DECODE block to produce a RST pulse at bistable RS F/F. A positive edge at comparator CMPPFC is decoded by the PULSE DECODE block to produce a SET pulse at bistable RS F/F. Comparator CMPPFC always switches to zero on the positive edge of conversion clock CLK, because ramp generator RMP falls to zero at that time, but circuit block LIMITS prevents the DIFF AMP output from falling below a minimum voltage. By that means, bistable RS F/F is always cleared at the rising edge of conversion clock CLK. Bistable RS F/F is set when ramp generator RMP exceeds the limited output of DIFF AMP. The Comparator CMPPFC sets a nearly constant ON time responsive to the difference between (i) the flyback reference FREF in the REFERENCE block and (ii) the storage voltage STOR. This feedback path is here labeled as SLOW LOOP. DIFF AMP, through the ratios of R3 to R4, and R5 to R6, produces a signal proportional to the difference from the desired relationship of STOR to FREF. Resistor R7 sets the gain of DIFF AMP, slowed by filter capacitor C3. In the example shown, the storage voltage STOR regulates approximately 20 Volts above the reference FREF. The output of DIFF AMP is clamped between preset limits by control block LIMITS. The LIMITS block can be fixed or dynamic. By clamping the output voltage of DIFF AMP, the LIMITS block acts to determine the minimum and maximum ON time allowed for switches S1 and S2. The limited output of DIFF AMP is compared to ramp generator RMP by comparator CMPPFC. The ramp generator signal RMP is preferably synchronous with the conversion clock CLK, as indicated in the TIMING block. The higher the voltage at comparator CMPPFC, the longer the energize period, and the more energy is loaded into transformer T1. When the storage voltage STOR is above the set point, the output of DIFF AMP is reduced, reducing ON time. In like fashion, when the storage voltage STOR is below the set point, ON time is increased. Filter capacitor C3 prevents the ON time signal CMPPFC from varying enough during a single cycle of the AC line to degrade the PFC performance.

Resistor R1 and capacitor C1 suppress spikes on the flyback winding of transformer T1. Bistable F/FFLY controls the enable input EN of the synchronous rectifier control SYNCRCT. The conversion clock CLK latches the output of comparator CMPF into bistable F/FFLY at the start of each conversion cycle. If the output voltage OUTPUT, is below the reference voltage FREF, then the enable EN will be set, allowing the synchronous rectifier control to act. If, at any time, comparator CMPF determines that OUTPUT has exceeded reference FREF, then bistable F/FFLY is cleared through inverter U3, which in turn disables the SYNCRCT control.

In one embodiment, the storage voltage STOR is used to provide holdover power to LOAD during zero crossings of the AC input voltage. A BUCK converter comprised of a two-terminal inductor L1, switch S4, and diode D4, moves energy from the higher storage voltage STOR to the OUTPUT. Resistor R2 and capacitor C2 suppress spikes at the inductor L1. A control loop, described below, operates the buck converter switch S4. The buck converter can be synchronous or asynchronous with the flyback converter. In this case, inverter U4 causes the buck stage to operate synchronously, but out of phase, with the flyback stage by inverting the conversion clock signal CLK before it is applied to the clock input of bistable F/FBUCK. Note that the duty cycle of conversion clock CLK can be varied to optimize the interaction of the two stages. The buck stage is enabled by sufficient voltage STOR, as determined by comparator CMPS. When voltage STOR exceeds voltage reference BREF by at least voltage SREF, comparator CMPS presents data of one to bistable F/FBUCK. When the output of bistable F/FBUCK is one, switch S4 closes to energize inductor L1 from capacitor CSTOR. Energizing continues until OUTPUT exceeds reference BREF, as determined by comparator CMPB. Comparator CMPB resets bistable F/FBUCK when the set point is reached. The current remaining in inductor L1 is recovered through diode D4, in conventional fashion.

Diodes D3 and D4 could optionally be replaced with synchronous rectifiers for improved efficiency. Switches S1, S2, S3, and S4 could optionally be replaced by saturable inductors. Capacitor CSTOR can be as small as capacitor CFILT, or as large as practical, or can be replaced by rechargeable batteries or other bidirectional storage medium. Larger values for capacitors CSTOR and CFILT will not cause destabilizing phase shift. Best values for inductance and capacitance depend on operating frequency and performance requirements. Flyback and buck operation can be discontinuous or not. Smoothest dynamic response is obtained with discontinuous operation. The relative values of references FREF, BREF, and SREF, and the settings in the LIMITS control, provide generous means for converter optimization.

Figure 3:
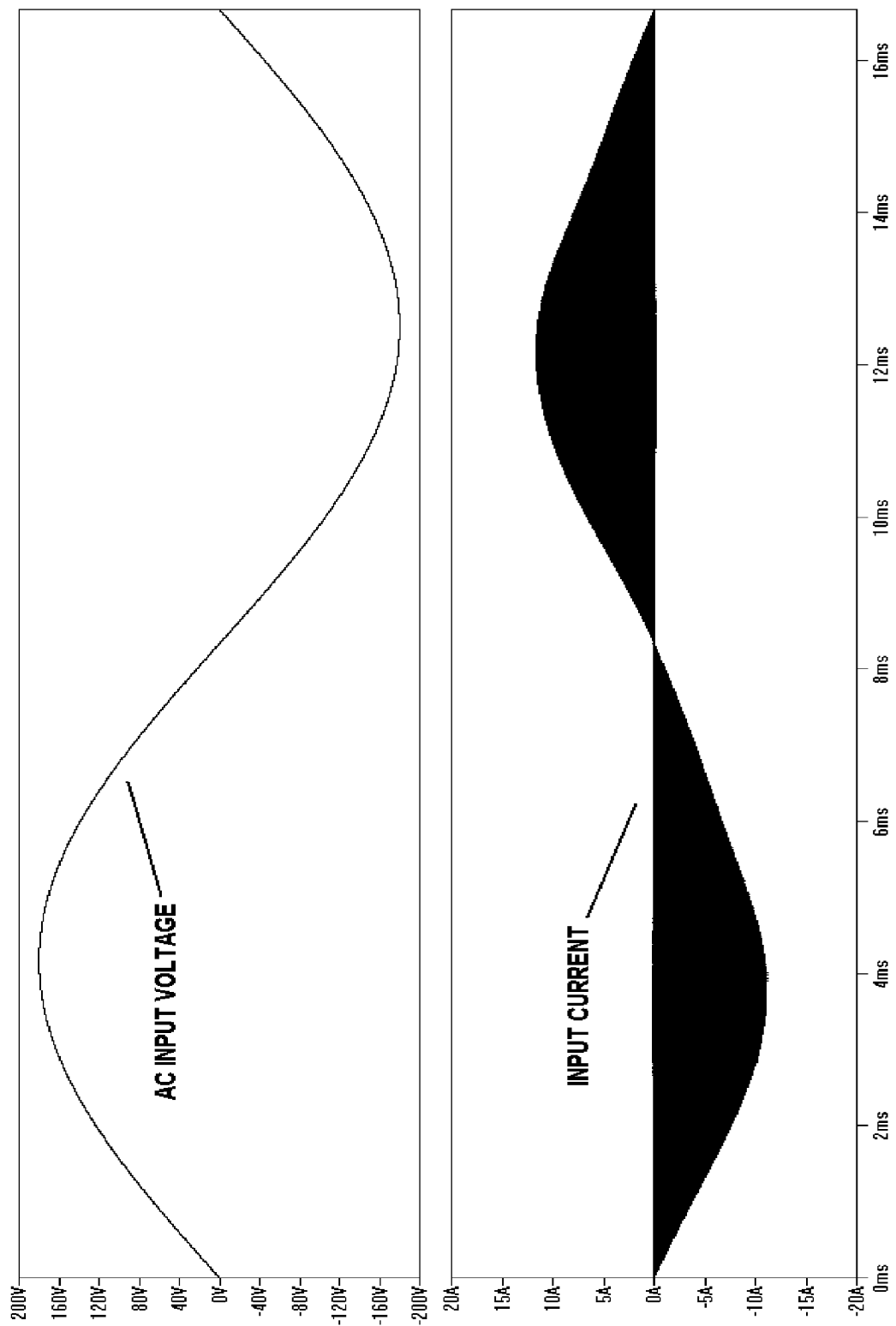
FIG. 3 shows the simulated performance of the PFC function of the circuit in FIG. 2.

FIG. 3 shows the performance of the PFC function, where input current is admitted in proportion to an AC input voltage. A minimal inductive line input filter will smooth the input current pulses that occur at the switching frequency and will leave a sinusoid current waveform in phase with the AC input voltage as the INPUT CURRENT waveform. The upper trace is the AC INPUT VOLTAGE itself. The converter is here operating at full load throughout the AC cycle. The slight distortion of the INPUT CURRENT waveform seen is due to insufficient time for settling of the storage voltage feedback amplifier DIFF AMP.

Figure 4:
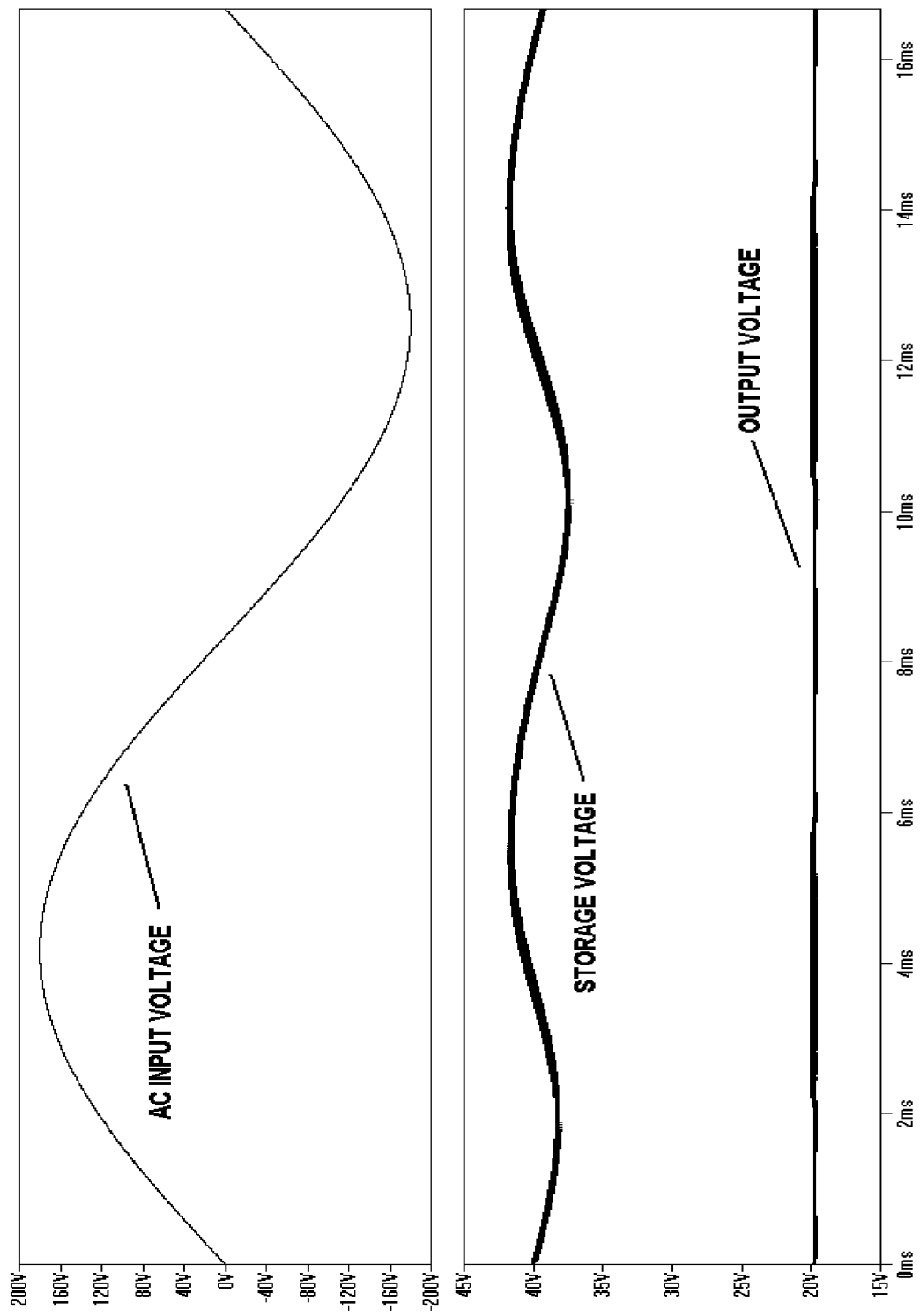
FIG. 4 shows the regulated and storage voltage outputs of the circuit in FIG. 2.

FIG. 4 again shows one cycle of the AC INPUT VOLTAGE on the upper axis. The lower axis shows both the STORAGE VOLTAGE (STOR) and the OUTPUT VOLTAGE (OUTPUT). Again, the converter is operating at full load for the entire AC input cycle. The regulated output voltage is 20 volts. The nominal storage voltage is 40 volts. The storage voltage can be seen to fall during zero crossing periods, and to rise when the input voltage is of larger magnitude. Some phase lag can be seen in the storage voltage because charging of the storage capacitor CSTOR does not begin until after the AC input has passed out of the zero crossing region. The amount of variation of the storage voltage during one AC cycle is a function of the load current and the value of CSTOR. A smaller value capacitor will serve for one AC cycle if a higher storage voltage is selected. At low loads, the STORAGE VOLTAGE becomes nearly constant.

Figure 5:
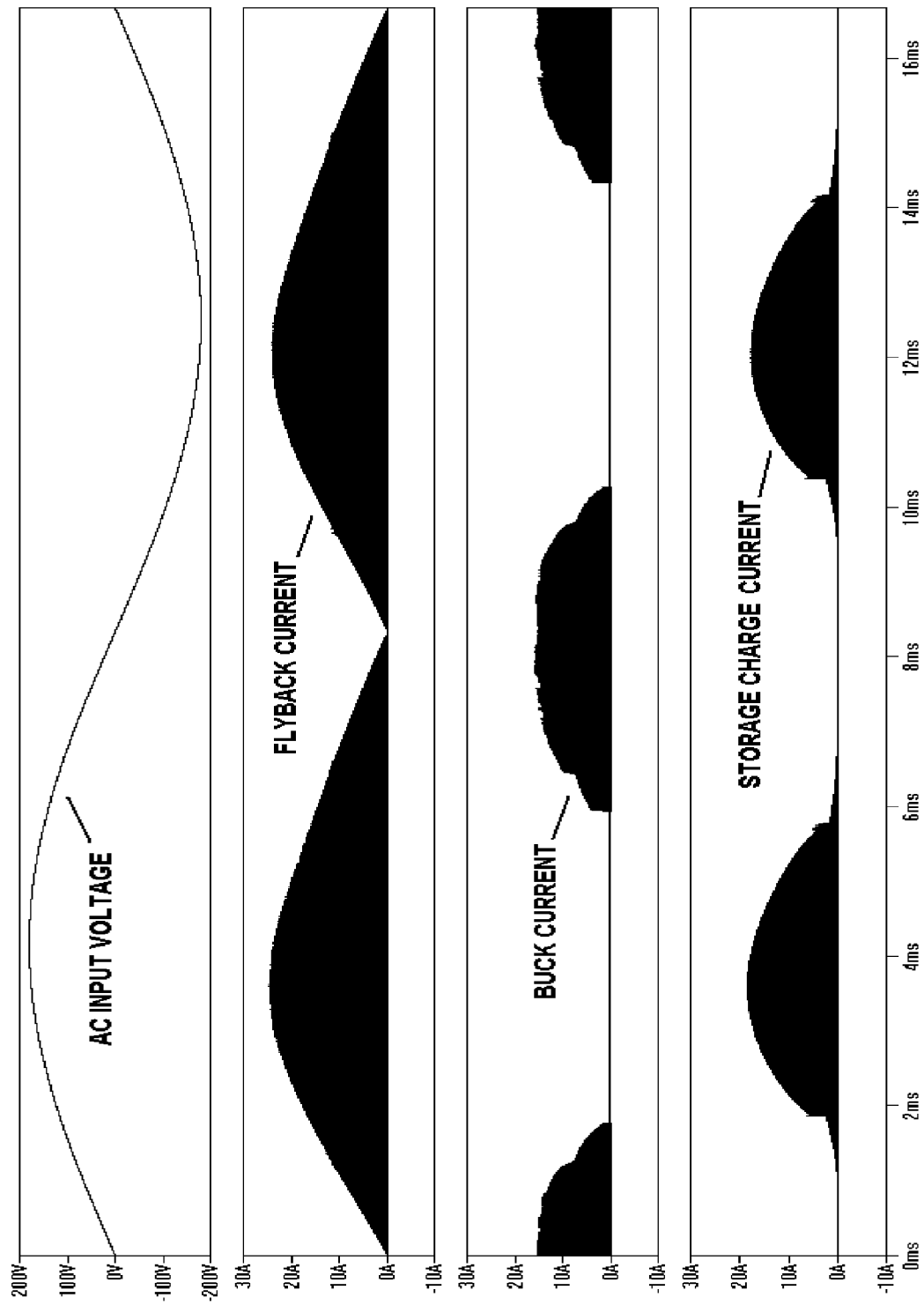
FIG. 5 shows the current distribution between the flyback and buck stages and storage charging.

FIG. 5 again shows one cycle of the AC INPUT VOLTAGE on the upper axis. The second axis shows the current FLYBACK CURRENT in the synchronous rectifier in the flyback path. The third axis shows the current BUCK CURRENT in the buck path. The lower axis shows the charging current STORAGE CHARGE CURRENT for the reservoir. The load is here 50% for the entire AC cycle. When the AC INPUT VOLTAGE is near its maximum magnitude, all the load current is provided by the flyback stage. When the AC INPUT VOLTAGE is near zero, all the load current is provided by the buck stage. There are intermediate periods when both buck and flyback converters are active. The lower the load, the smaller the percentage of power that is provided via the buck path. The buck path incurs a second set of losses, so less reliance on the buck path improves efficiency. At full load, 65% of the energy is typically transferred through the more efficient flyback path. At half load, near 80% of the load is typically supplied by the flyback stage. The flyback proportion continues to rise at lighter loads. Because achieving efficiency targets at low loads is the larger challenge in meeting industry efficiency standards, the improved low-load efficiency made possible by this topography is of particular value. STORAGE CHARGE CURRENT is seen to flow only when the AC INPUT VOLTAGE is of higher magnitude.

Figure 6:
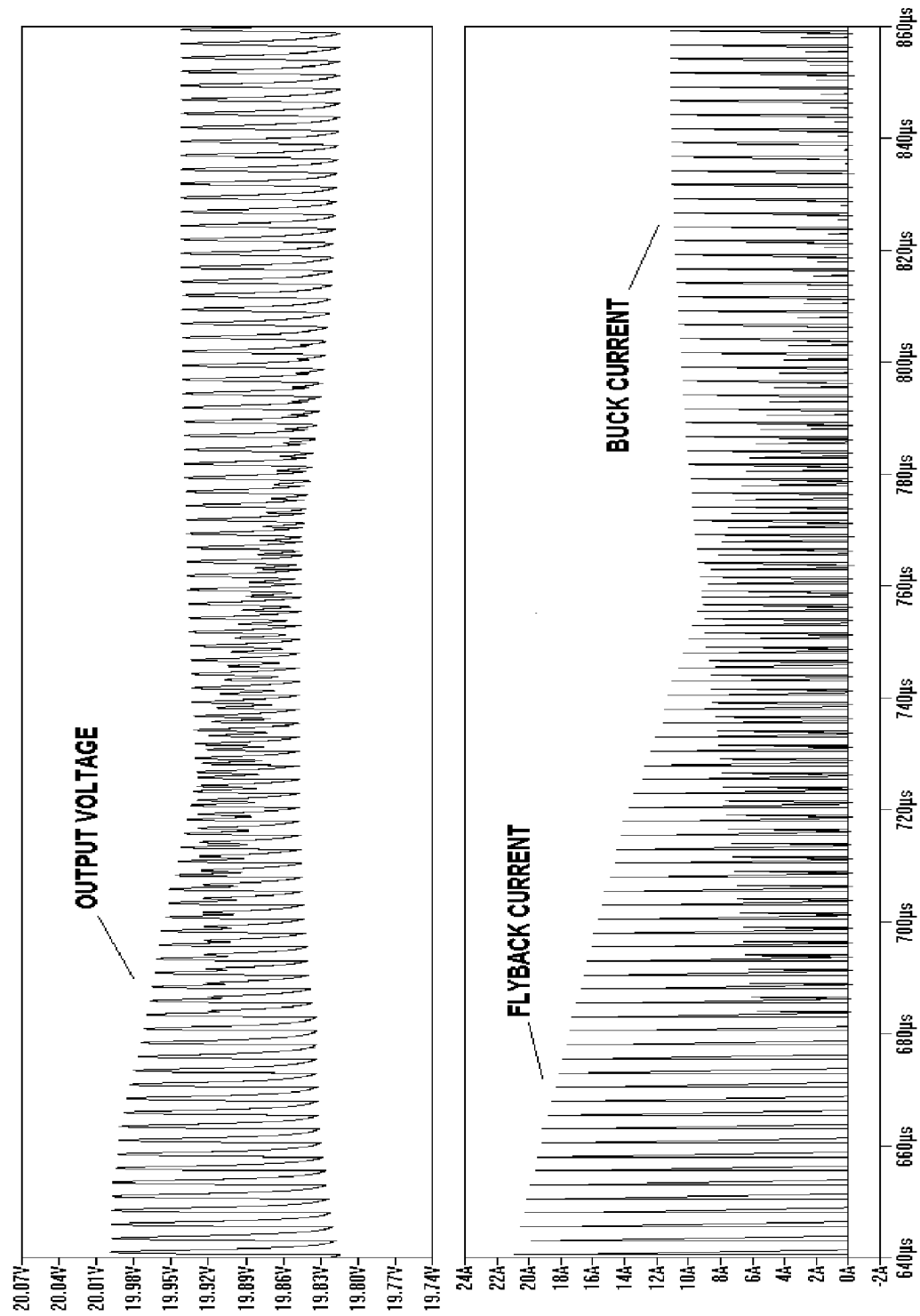
FIG. 6 details the transition between flyback and buck at zero crossing.

FIG. 6 shows a detail of an AC input voltage zero crossing at 50% load. The flyback reference voltage FREF is set at 20 volts. The buck reference voltage BREF is set about 100 mvolts lower. That difference prevents the buck stage from operating during most of the AC cycle, allowing higher efficiency. If lower ripple is the goal, then an equal reference for both stages will minimize ripple at the expense of efficiency. Even if only half the power moves through just the flyback stage, then that represents the potential for a 25% reduction in losses.

The upper axis shows OUTPUT VOLTAGE. At about 660 us, it is seen to drop from the flyback reference to the buck reference as the flyback converter begins to go out of regulation because of an approaching zero crossing at the input voltage. The buck converter begins to contribute when the output falls below BREF, around 685 us. For a period, both the flyback and buck stages operate alternately. At around 830 us, the flyback current falls to zero, and the buck stage briefly does all the work. Shortly after, just past the AC input voltage zero crossing, the flyback stage again begins to contribute. In this example, at half load, approximately 80% of the current passes through only the flyback stage. If both stages were 90% efficient at half load, then a conventional two-stage converter would provide 81% overall efficiency. This converter would provide 90%*80%+81%*20% or 88% overall efficiency. As the load approaches zero, the losses incurred by the power converter of FIG. 2 approach half those of a conventional, two-stage converter. Note that there are known methods for further improving the efficiency of flyback or buck conversion stages. These methods use components that command a premium price, so marginal efficiency improvements become increasingly costly. Certain embodiments of the present invention provide a mechanism for a greater efficiency improvement while using more ordinary components.

This converter provides an extra degree of control compared to a conventional, two-stage converter. By statically or dynamically adjusting the difference between FREF and BREF, the trade-off between ripple and regulation versus efficiency can be controlled. Even when the difference between flyback and buck references is zero, an efficiency advantage over the conventional two-stage alternative is enjoyed because of the power which is transferred through only the flyback stage.

Figure 7:
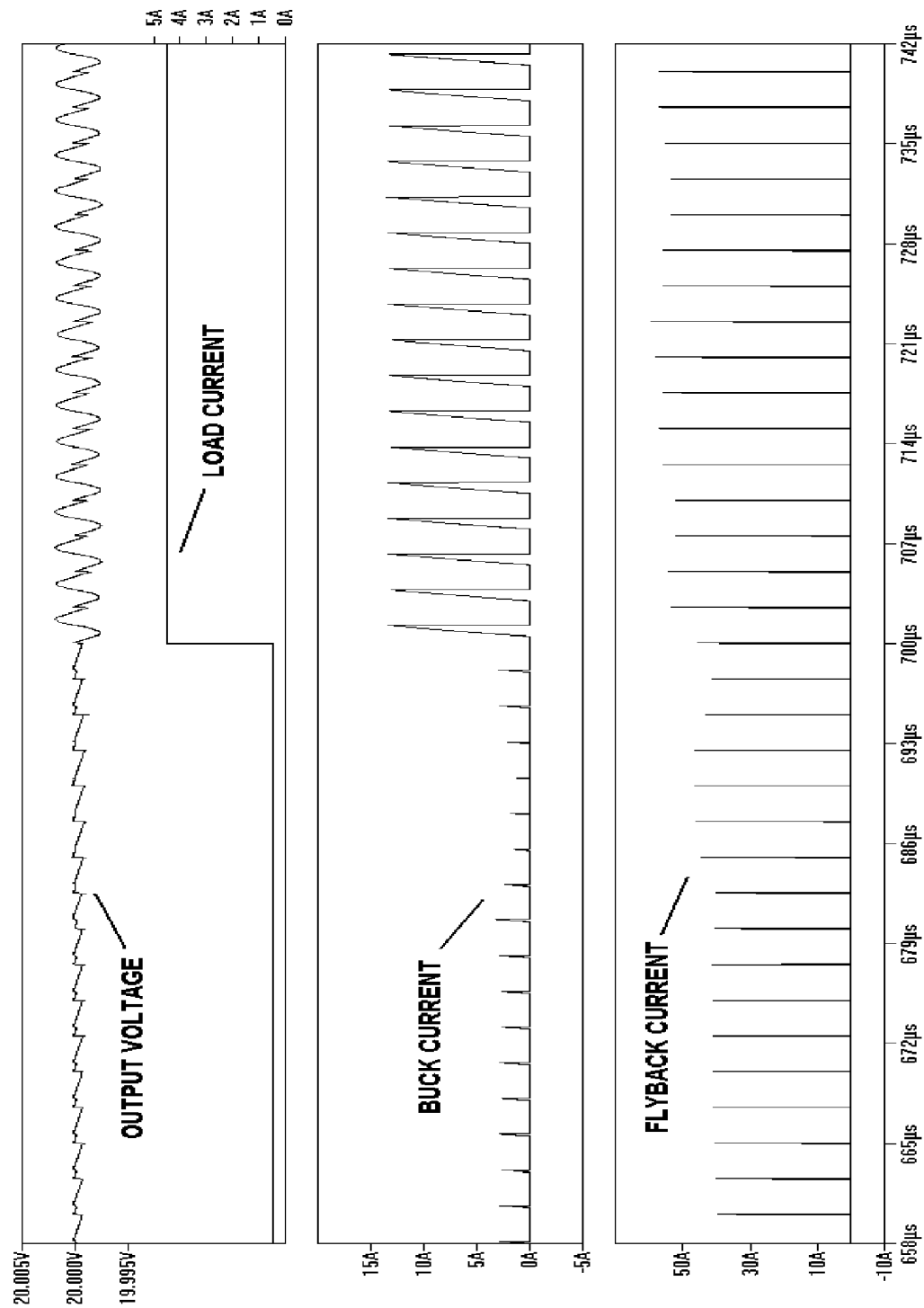
FIG. 7 details the transient regulation.

FIG. 7 is a detail of the transient response during an instant step from 10% to 90% load with BREF set equal to FREF. The waveforms will look different at different points in the AC cycle. At 10% load, almost all of the energy for the load is being delivered by the flyback stage. The intentionally slow response of the PFC loop prevents the flyback converter from supplying additional energy in response to the increased load, as seen in the FLYBACK CURRENT appearing on the lower axis. The increase seen in FLYBACK CURRENT delivered to the load represents the cessation of transfer to storage. In contrast, the buck stage can act immediately to maintain regulation, as seen by the BUCK CURRENT increase on the middle axis. The output voltage is seen to be supported by current from the buck and flyback stages in alternation. This alternation reduces ripple, reducing the size required for the filter capacitor.

The regulation in discontinuous mode shown in FIG. 7 completely lacks the undershoot and overshoot characteristic of conventional pulse width modulated switched mode power controls. Because any excess flyback inductive energy is directed to the storage capacitor, regulation is equally good when the load current drops suddenly. Certain embodiments of the present invention will operate in continuous mode without alteration provided that higher-current power components are employed.

Figure 8:
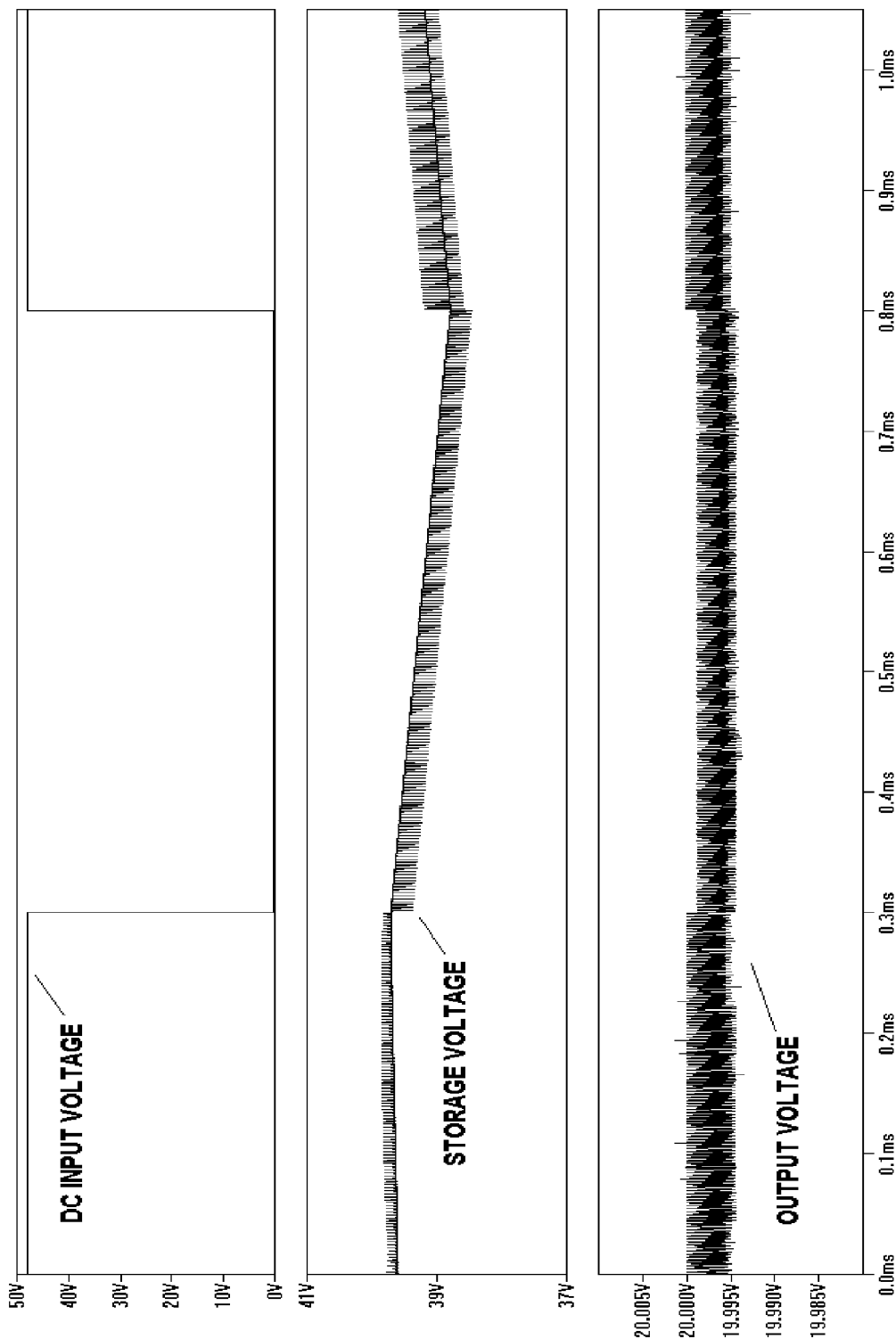
FIG. 8 shows a variation for DC to DC conversion

FIG. 8 shows DC to DC conversion at 50% load. The DC INPUT VOLTAGE is shown at 48 VDC, but it drops to zero volts for one ms. The supplemental power converter supplies the load during the interruption of the DC input voltage, as seen in the OUTPUT VOLTAGE. The STORAGE VOLTAGE is seen to drop during holdover and to begin to be recharged afterward. PFC does not apply in circumstances of DC input; however, the regulation and flexibility offered by this topology remain valuable for regulation, efficiency, redundancy, and flexibility. Note that in this configuration, some load is placed on the reservoir during normal operation to allow the regulation of STOR. BREF is here set close to FREF such that the supplemental buck operates at a low current under static conditions during normal operation.

Another embodiment will function in the same fashion with a DC input voltage. By removing the unused T1 primary winding and corresponding diode, switch, and control, either polarity of DC input voltage can be accommodated. If isolation is not required, then T1 and T2 can be eliminated, and the switched inductor energized directly through a switch responsive to CMPPFC.

Figure 9:
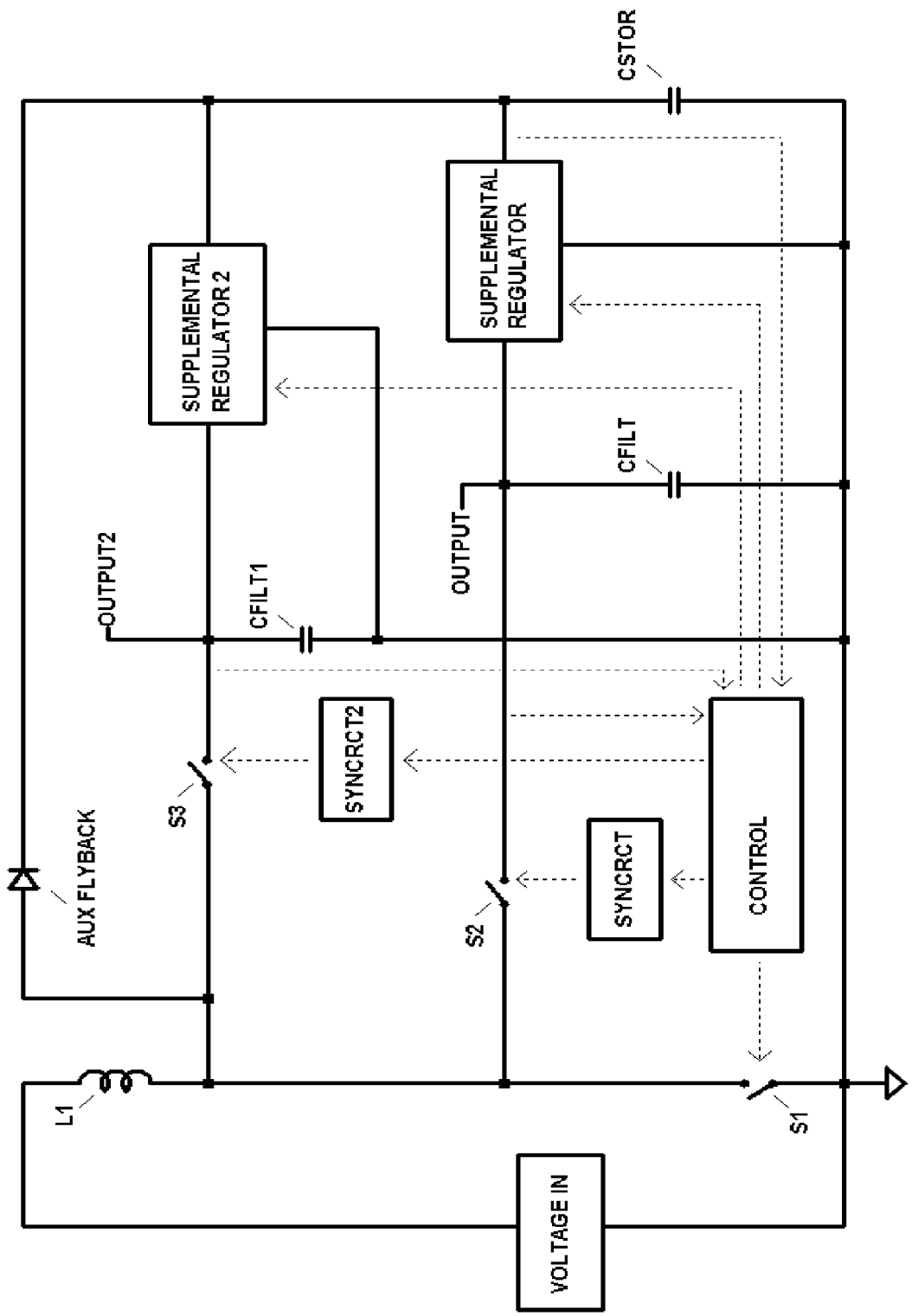
FIG. 9 is a block diagram of a multi-channel version.

FIG. 9 shows a block diagram of a multi-channel version of a compound converter. VOLTAGE IN supplies inductor L1 through switch S1, the same as in FIG. 1. The AUX FLYBACK diode supplying CSTOR is also identical to FIG. 1. The addition of switch S3, controlled by SYNCRCT2 to regulate the voltage at filter capacitor CFILT1 provides a second regulated output OUTPUT2. The same CSTOR voltage now provides input for both SUPPLEMENTAL REGULATOR and SUPPLEMENTAL REGULATOR2. SUPPLEMENTAL REGULATOR2 supports OUTPUT2 as determined by CONTROL. A number of additional outputs can be added in like manner.

It will be obvious to those skilled in the art that, although FIG. 9 is shown with a DC input voltage, the AC input circuitry of FIG. 2, or other input rectification circuitry, could alternatively be provided.

Figure 10:
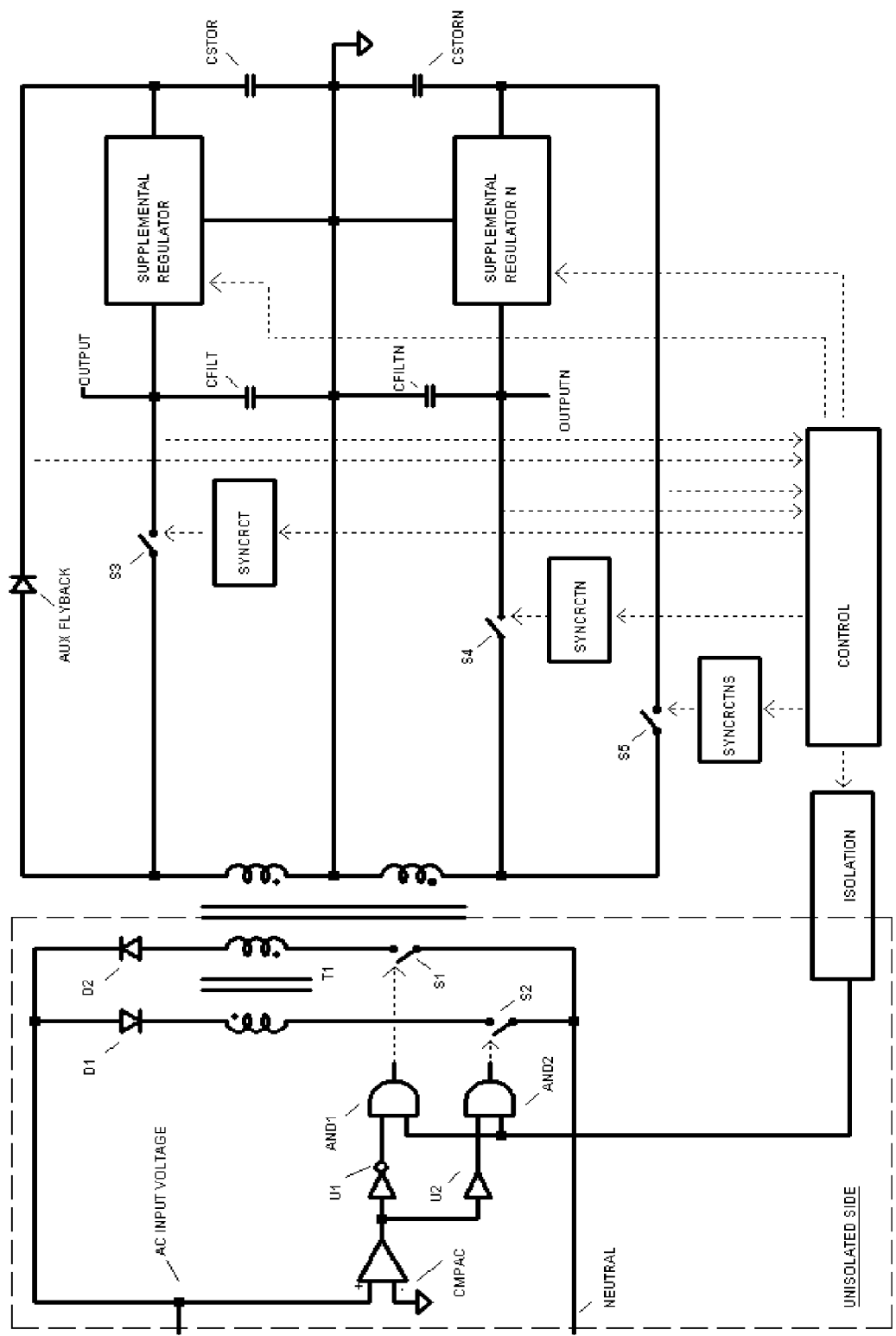
FIG. 10 shows a complementary output power converter.

FIG. 10 shows a complementary output power converter constructed of two compound power converters. The UNISOLATED SIDE circuit is identical to FIG. 2, shown here in slightly simplified form. A fourth winding is added to T1 to generate negative flyback voltages. Switches S4 and S5, controlled by SYNCRCTN and SYNCRCTNS, respectively, regulate the voltages at filter capacitors CFILTN and CSTORN. The SUPPLEMENTAL REGULATORN supports OUTPUTN as determined by CONTROL. The CONTROL function is the same for the negative portion except that the negative storage voltage CSTORN can be better regulated than CSTOR. In order for a diode to serve as the control for the AUX FLYBACK function, CSTORN should be of lower magnitude than CSTOR so that CSTOR will be energized only after CSTORN is satisfied. In the example, the CSTORN voltage is 36 volts, while the CSTOR target is 40 volts.

It will be obvious to those skilled in the art that, although FIG. 10 is shown with an AC input voltage, a DC input voltage can alternatively be accommodated with simplified circuitry, such as is shown in FIG. 1.

Figure 11:
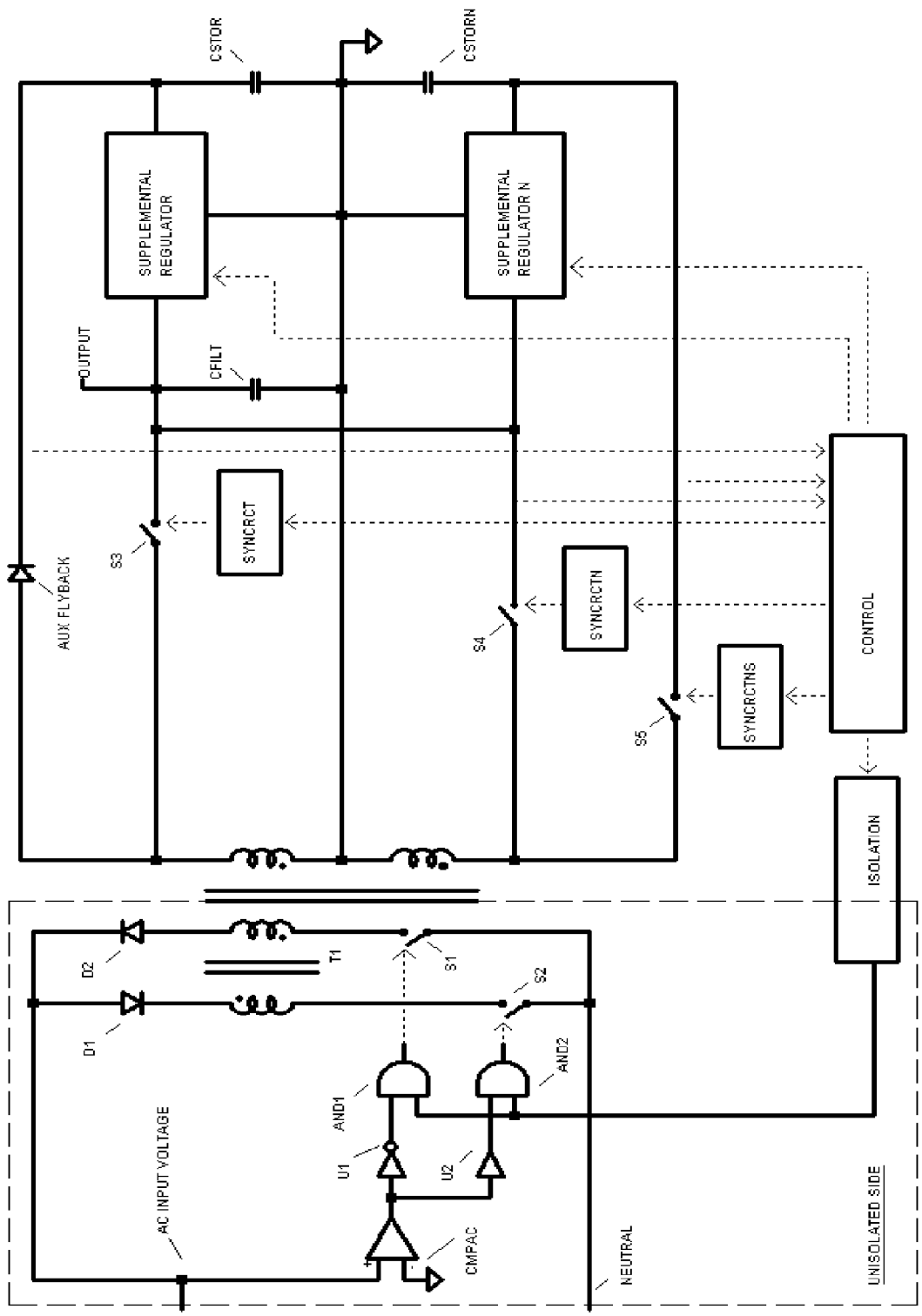
FIG. 11 shows a compound converter capable of AC to AC conversion.

FIG. 11 shows a variation for AC to AC conversion. The AC INPUT VOLTAGE is the same as the earlier figures. The circuit is identical to the complementary example of FIG. 10 except that both positive and negative halves of the converter drive a single OUTPUT. The CONTROL block here functions somewhat differently. The reference for the positive half is slightly higher than the reference for the negative half. That causes one or the other polarity to deliver power, based on the OUTPUT and reference voltages, with a narrow band in the middle where neither half is active, preventing simultaneous conduction. The output filter capacitance is reduced in value to allow the passage of higher frequencies. CSTOR and CSTORN can be increased to enable a wider OUTPUT excursion.

The circuit of FIG. 11 will also perform DC-AC conversion. It is apparent to anyone skilled in the art that, if only DC-AC conversion is needed, then the energizing circuitry can be simplified.

The examples given here are a sampling of the forms this invention can take. Anyone skilled in the art can apply variations that are covered under this teaching. Such variations include, but are not limited to: the substitution of saturable inductors for switches; the substitution of switches for diodes; the addition of an extra transformer or inductor tap for deriving alternate voltages; the substitution of a transformer or autotransformer for a simple inductor; the substitution of a simple inductor for a transformer if neither isolation nor a turns ratio is needed; or adding a turns ratio to a transformer or changing a turns ratio.

A compound converter is distinguished from two power converters in parallel and from two converters in series in that, in a compound converter, some of the energy moves through the auxiliary flyback stage and the supplemental regulator, and some of the energy moves only through the main flyback converter. The same mechanism that produces regulation at the main flyback output produces the auxiliary flyback output. The compound topology enables both greater efficiency and reductions in complexity. A compound converter provides for UPS operation with a large reservoir, or PFC function with a reservoir large enough to support the output during a single AC cycle. For UPS operation, the first supplemental energy storage element is sufficient to supply hold-over energy to the first output node for a specified period of time. A compound converter can also function to reduce ripple, to improve regulation, or to provide redundancy. Further, this power conversion topology is well-suited for the faster, bipolar blocking power switches that are now becoming available.

Figure 12:
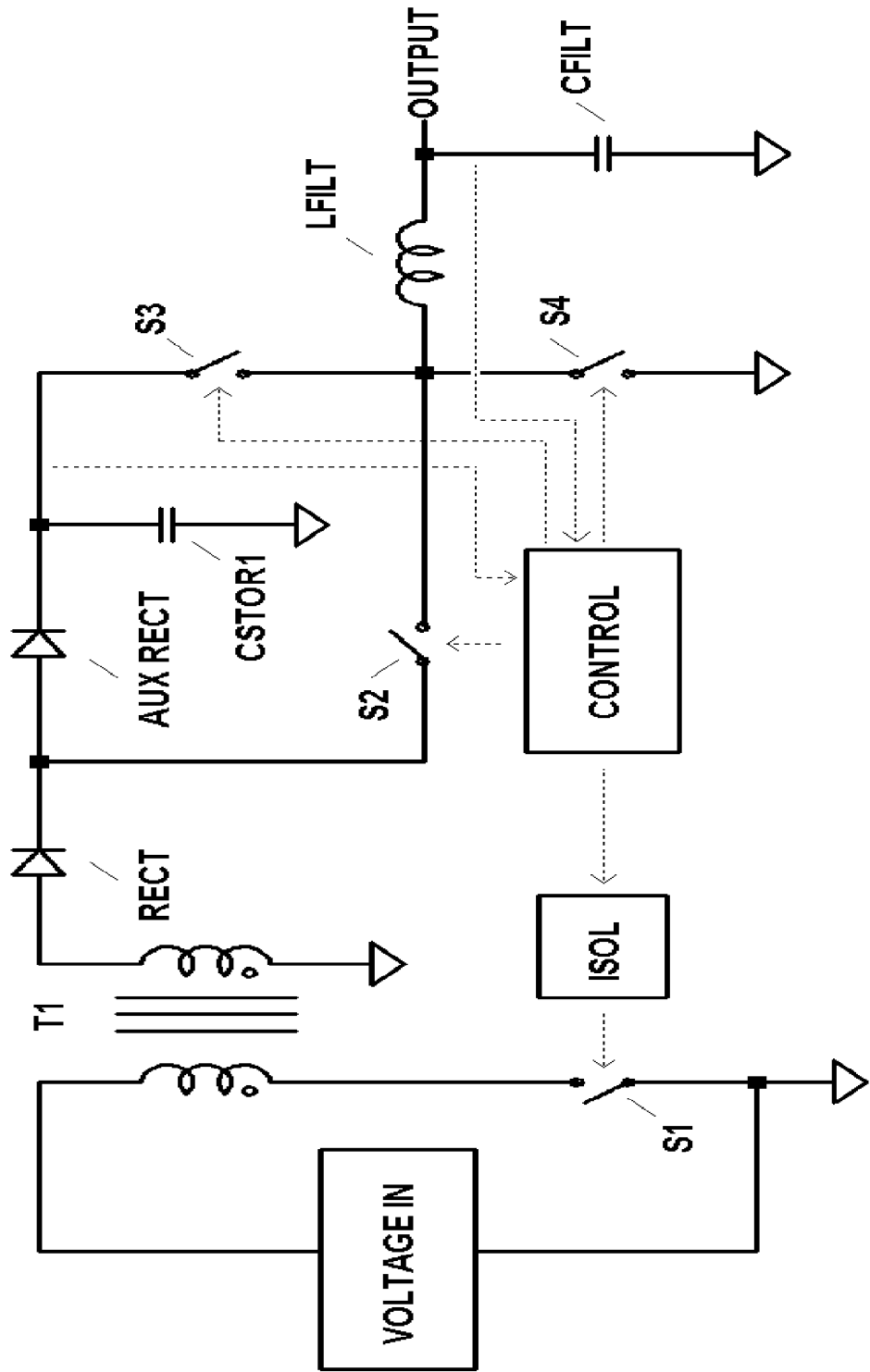
FIG. 12 shows a compound forward converter with a bidirectional buck supplementary converter.

FIG. 12 shows a forward converter variation with a buck converter as the supplementary converter. The VOLTAGE IN energizes the primary of transformer T1, responsive to switch S1. Switch S1 is controlled by circuit block CONTROL, through isolation block ISOL. Secondary current in transformer T1 is rectified by diode RECT and passes through switch S2 under the control of circuit block CONTROL. The current is filtered by an LC filter consisting of two-terminal inductor LFILT and capacitor CFILT to produce the OUTPUT voltage. Switch S2 is opened by circuit block CONTROL when the load at the OUTPUT is satisfied. Any excess secondary current then flows through diode AUX RECT to capacitor CSTOR1. Current remaining in LFILT transfers to the OUTPUT until zero current is reached, at which point circuit block CONTROL opens switch S4. Switch S3 remains open during all the above times.

As in the previous examples, circuit block CONTROL roughly regulates the voltage on CSTOR1 by varying the slowly changing on-time of switch S1. During periods when VOLTAGE IN is insufficient to supply the OUTPUT, or is entirely absent, switches S3 and S4, with inductor LFILT, form a buck converter. The buck converter operates when circuit block CONTROL closes switches S3 and S4 alternately to energize inductor LFILT from capacitor CSTOR1 and to transfer energy from inductor LFILT to the OUTPUT. Predictive energy balancing as described in U.S. Pat. Nos. 7,642,758 and 7,965,064 and U.S. Patent Application No. 2011/0115455 can be employed to smooth operation of the buck converter. Further, energy recovery as described in U.S.

Patent Application No. 2009/0189581 can be accomplished by employing switches S3 and S4 in a different fashion. To recover unneeded OUTPUT energy from capacitor CFILT, circuit block CONTROL closes switch S4, energizing inductor LFILT with opposite polarity current until the OUTPUT voltage is reduced to the desired level. Circuit block CONTROL then opens switch S4 and closes switch S3 causing inductor LFILT to flyback and transfer energy to capacitor CSTOR1. Once that transfer is complete, circuit block CONTROL opens switch S3. At that point, either an additional reverse recovery cycle or a forward energy transfer cycle can be initiated.

Many variations of FIG. 12 will be evident to those skilled in the art. Transformer T1 can be replaced with a simple inductor to make a direct-coupled version. Diodes RECT and AUX RECT can be replaced with synchronous rectifiers. If energy recovery is not needed, then switch S4 can be replaced by a diode. A separate inductor could be used for the supplemental buck converter function. Zero current switching as described by Vinciarelli in U.S. Pat. No. 4,415,959 can be employed with the addition of a resonating capacitor. Zero current switching requires a fixed ON time for switch S1, and a variable frequency for controlling the total energy converted. With a rectified AC input, PFC can be achieved.

The compound converter of FIG. 12 can have even greater efficiency advantages over a two-stage converter than does the converter of FIG. 2 because of the potential for using zero voltage switching and the potential to recover excess energy from the OUTPUT. Voltage and current stresses, and radiated interference, can be reduced by using the forward conversion topology. In applications where the OUTPUT voltage is to be dynamically adjusted, the energy recovery function is valuable. In applications where the OUTPUT voltage is to be precisely regulated, the extra agility of predictive energy balancing is valuable.

Figure 13:
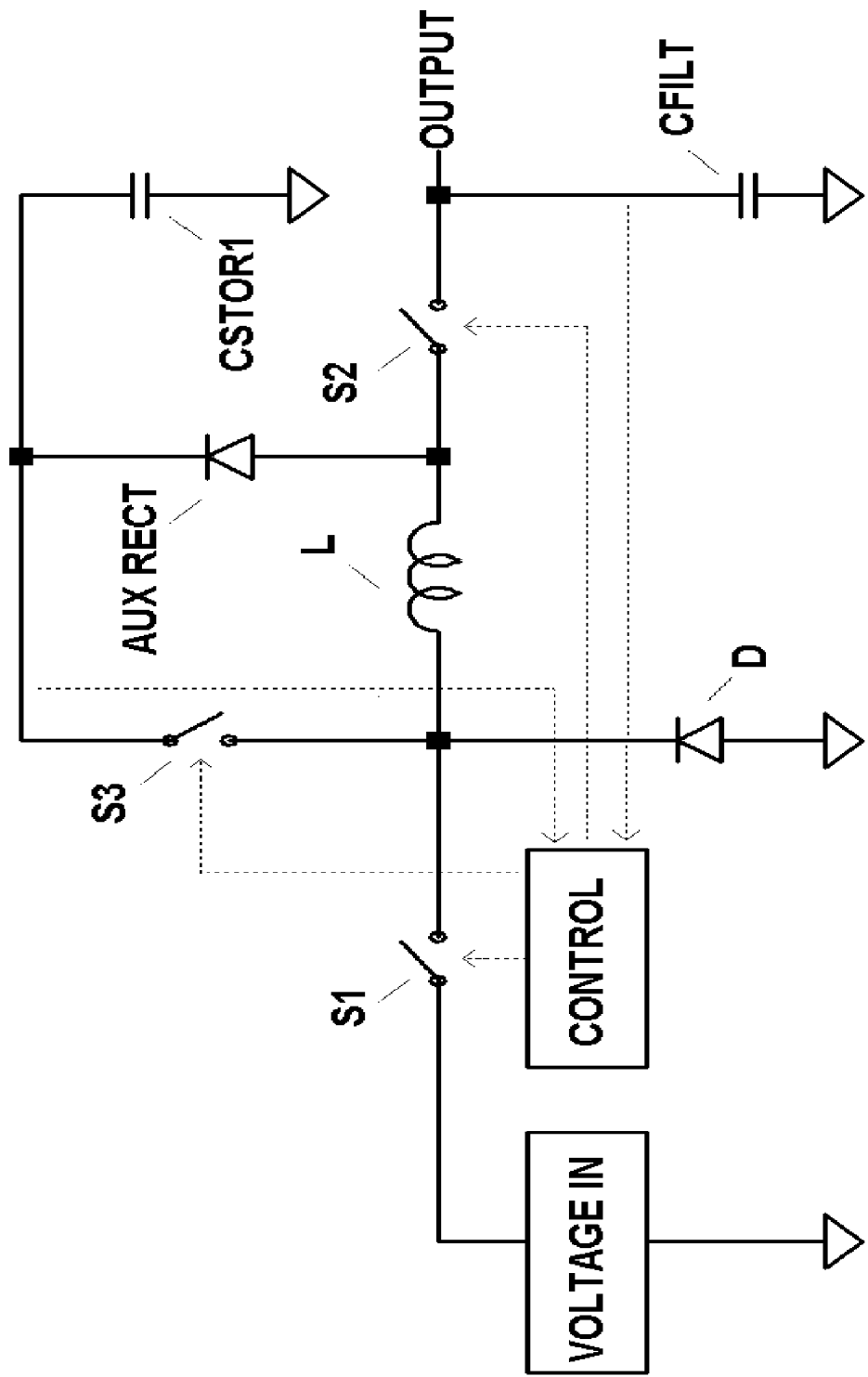
FIG. 13 shows a compound buck converter.

FIG. 13 shows a compound buck converter variation. VOLTAGE IN energizes inductor L responsive to switch S1. Switch S1 is controlled by circuit block CONTROL. In normal buck converter operation, switch S2 remains closed, and switch S3 remains open. Current flows through diode D to transfer inductive energy to the OUTPUT when switch S1 is opened. Capacitor CFILT filters the OUTPUT voltage. Switch S2 can be opened by circuit block CONTROL when the load at the OUTPUT is satisfied. Any excess current in inductor L then flows through diode AUX RECT to capacitor CSTOR1. As in previous examples, circuit block CONTROL can maintain a slight excess of average inductor energy, causing that excess to be transferred to capacitor CSTOR1. Should additional energy be needed for regulation of the OUTPUT, or should VOLTAGE IN be interrupted, switch S3, responsive to circuit block CONTROL, can energize inductor L from capacitor CSTOR1. The compound structure serves both to enable improved regulation and to provide holdover power and redundancy. If diode D is replaced with a switch, with S1 open and S2 closed, that switch can operate to reverse energize inductor L from the OUTPUT. Opening the additional switch then transfers energy to CSTOR1 in normal flyback fashion. The ability to operate the supplemental converter bidirectionally further improves regulation and enables the efficiencies of energy recovery.

Many combinations of the techniques described herein will be evident to those skilled in the art. Circuit blocks can be recombined in a matrix of possibilities. The power input for any output structure can be AC or DC. AC input converters can be configured to perform PFC, or not. Compound converters can be isolated or non-isolated. A compound converter can employ a flyback converter, a buck converter, a forward converter, or a zero voltage switching forward converter as the main converter. Other, equivalent, main converter options exist, such as SEPIC or buck/boost converters. Supplemental converters can also be of various types, including linear converters.

The output of a compound converter can be single, dual, multiple, complementary, bipolar, or bidirectional. Additional outputs can be added to any converter. The input configurations, output configurations, and main converter topologies shown may be mixed in any combination to provide a compound converter. The particular examples described herein are representative samples, only.

Certain embodiments of the present invention shown in the figures and described in the text have a number of elements and functions in common. In particular, each of these embodiments is a power converter for converting input power into regulated output power. Each power converter comprises an input node for receiving the input power, a first output node for providing the regulated output power, a main regulator connected between the input node and the first output node, a first supplemental energy storage element, a supplemental energy gating element connected between the main regulator and the first supplemental energy storage element, a first supplemental regulator connected between the first supplemental energy storage element and the first output node, and a controller configured to control the main regulator and the first supplemental regulator to (i) selectively allow energy to flow from the input node (a) to the first output node or (b) to the first supplemental energy storage element and (ii) selectively allow energy to flow from the first supplemental energy storage element to the first output node via the first supplemental regulator.

In the embodiments shown in FIGS. 1-2 and 9-13:
The input node is at VOLTAGE IN in FIGS. 1, 9, 12, and 13, and at AC INPUT VOLTAGE in FIGS. 2, 10, and 11;
The first output node is OUTPUT in all of the figures. Note that there is a second output node in each of FIG. 9 (i.e., OUTPUT2) and FIG. 10 (i.e., OUTPUTN);
The main regulator comprises inductor L1, switches S1 and S2, and capacitor CFILT in FIG. 1. In FIG. 2, the main regulator comprises transformer T1, switches S1-S3, diodes D1-D2, resistor R1, and capacitors C1 and CFILT. In FIG. 9, the main regulator comprises inductor L1, switches S1-S3, and capacitors CFILT and CFILT1. In FIG. 10, the main regulator comprises transformer T1, switches S1-S5, diodes D1-D2, and capacitors CFILT and CFILTN. In FIG. 11, the main regulator comprises transformer T1, switches S1-S5, diodes D1-D2, and capacitor CFILT. In FIG. 12, the main regulator comprises transformer T1, switches S1, S2, and S4, diode RECT, inductor LFILT, and capacitor CFILT. In FIG. 13, the main regulator comprises switches S1, S2, diode D, inductor L, and capacitor CFILT;
The first supplemental energy storage element is capacitor CSTOR in FIGS. 1-2 and 9-11 and capacitor CSTOR1 in FIGS. 12-13. Note that each of FIGS. 10-11 has a second supplemental energy storage element (i.e., capacitor CSTORN);
The supplemental energy gating element is diode AUX FLYBACK in FIGS. 1-2 and 9-11 and diode AUX RECT in FIGS. 12-13;
The first supplemental regulator is SUPPLEMENTAL REGULATOR in FIGS. 1 and 9-11. In FIG. 2, the first supplemental regulator is the buck converter BUCK. In FIG. 12, the first supplemental regulator comprises switches S3-S4. Note that, in FIG. 12, inductor LFILT and switch S4 participate in the supplemental regulating function. In FIG. 13, the first supplemental regulator comprises switch S3. Note that, in FIG. 13, inductor L and switch S2 participate in the supplemental regulating function. Note further that there is a second supplemental regulator in each of FIG. 9 (i.e., SUPPLEMENTAL REGULATOR 2) and FIGS. 10-11 (i.e., SUPPLEMENTAL REGULATOR N); and The controller is block CONTROL in FIGS. 1 and 9-13. In FIG. 2, the controller comprises comparators CMPAC, CMPPFC, CMPF, CMPS, and CMPB and associated flip-flops and other circuitry.

Although embodiments have been described in which the main regulator includes capacitor CFILT, in alternative embodiments in which the output node OUTPUT is connected to a capacitive or otherwise reactive load, CFILT may be omitted.

Depending on the particular embodiment, the term "inductive element" may refer to a simple inductor, a transformer, or any other suitable device or combination of devices that provide inductance. The term "capacitive element" may refer to a capacitor or any other suitable device or combination of devices that provide capacitance. The term "energy gating element" may refer to a switch, a rectifier, a diode, or any other suitable device or combination of devices that selectively allow energy to flow though the element.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes or ports may be referred to by the same name and are interchangeable for purposes here.

It should be appreciated by those of ordinary skill in the art that any block diagrams herein represent conceptual views of illustrative circuitry embodying the principles of the invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non enabled embodiments and embodiments that correspond to non statutory subject matter are explicitly disclaimed even if they fall within the scope of the claims.

What is claimed is:

1. A power converter for converting input power into regulated output power, the power converter comprising:
    an input node for receiving the input power;
    a first output node for providing the regulated output power;
    a first switched-mode main regulator connected between the input node and the first output node to contribute main energy for regulation of the output power at the first output node;
    a first supplemental energy storage element;
    a first supplemental energy gating element connected between a first main inductive element of the first switched-mode main regulator and the first supplemental energy storage element;
    a first supplemental regulator connected between the first supplemental energy storage element and the first output node to contribute supplemental energy from the first supplemental energy storage element for the regulation of the output power at the first output node; and
    a controller configured to control the first switched-mode main regulator to (i) selectively operate an active first main energy gating element of the first switched-mode main regulator to energize the first main inductive element of the first switched-mode main regulator by admitting input current into the first main inductive element in proportion to input voltage at the input node and (ii) selectively operate an active second main energy gating element of the first switched-mode main regulator, wherein the controller selectively operates the active first and second main energy gating elements to allow energy to flow from the first main inductive element to (a) the first output node of the first switched-mode main regulator during at least one part of a control cycle of the first switched-mode main regulator during which energy does not flow from the first main inductive element to the first supplemental energy storage element and (b) the first supplemental energy storage element during at least another part of the control cycle of the first switched-mode main regulator during which energy does not flow from the first main inductive element to the first output node.

2. The power converter of claim 1, wherein the first supplemental regulator is a predictive energy balancing converter.

3. The power converter of claim 1, wherein the first switched-mode main regulator is a flyback converter.

4. The power converter of claim 1, wherein the controller is configured to perform Power Factor Correction on a rectified AC input voltage while regulating the output power at the first output node.

5. The power converter of claim 1, wherein the controller is configured to selectively control the first main energy gating element so that the energy held in the first supplemental energy storage element remains within a specified range.

6. The power converter of claim 1, wherein the first switched-mode main regulator comprises:
    the first main inductive element connected to the input node;
    the first main energy gating element connected to the first main inductive element and controlled by the controller; and
    the second main energy gating element coupled to the first main inductive element and to the first output node and controlled by the controller, wherein the controller is configured to selectively control states of the first and second main energy gating elements such that:
input energy can be transferred to the first main inductive element by action of the first main energy gating element during a first part of the control cycle of the first switched-mode main regulator;
energy held in the first main inductive element can be selectively transferred to the first output node via the second main energy gating element during a second part of the control cycle; and
energy held in the first main inductive element can be selectively transferred to the first supplemental energy storage element via the first supplemental energy gating device during a third part of the control cycle.

7. The power converter of claim 6, wherein:
the first main inductive element is a simple inductor;
the first main energy gating element is a first switch;
the second main energy gating element is a second switch;
the first supplemental energy storage element is a capacitor or a rechargeable battery; and
the first supplemental energy gating element is a diode or a switch.

8. The power converter of claim 6, wherein the first switched-mode main regulator comprises AC input rectifier circuitry configured to rectify AC input power applied to the input node.

9. The power converter of claim 8, wherein the first supplemental energy storage element supplies hold-over energy to the first output node via the first supplemental regulator while the first switched-mode main regulator is admitting input current into the first main inductive element in proportion to an AC input voltage applied at the input node to achieve Power Factor Correction (PFC).

10. The power converter of claim 8, wherein:
the first main inductive element is part of a transformer;
the first main energy gating element comprises at least a first switch;
the second main energy gating element is a second switch;
the first supplemental energy storage element is a capacitor or rechargeable battery; and
the first supplemental energy gating element is a diode or a switch.

11. The power converter of claim 10, wherein the first supplemental regulator is a buck converter.

12. The power converter of claim 1, wherein the first supplemental energy storage element is sufficient to supply hold-over energy to the first output node for a specified period of time, providing an Uninterruptible Power Supply (UPS) function.

13. The power converter of claim 1, further comprising:
a second output node;
a third main energy gating element; and
a second supplemental regulator, wherein the controller is further configured to selectively allow energy to flow to the second output node either (i) via the third main energy gating element or (ii) from the first supplemental energy storage element via the second supplemental regulator.

14. The power converter of claim 13, wherein the first switched-mode main regulator comprises:
the first main inductive element connected to the input node;
the first main energy gating element connected to the first main inductive element and controlled by the controller;
the second main energy gating element coupled to the first main inductive element and to the first output node and controlled by the controller; and
the third main energy gating element coupled to the first main inductive element and to the second output node and controlled by the controller, wherein the controller is configured to selectively control states of the first, second, and third main energy gating elements such that:
a specified amount of energy is loaded into the first main inductive element via the first main energy gating element, then
energy in the first main inductive element is transferred (i) to the first output node via the second main energy gating element and (ii) to the second output node via the third main energy gating element, then
any remaining energy in the first main inductive element is transferred to the first supplemental energy storage element via the first supplemental energy gating element.

15. The power converter of claim 13, further comprising one or more additional output nodes.

16. The power converter of claim 1, further comprising:
a second output node;
a second supplemental energy storage element; and
a second supplemental regulator to contribute supplemental energy from the second supplemental energy storage element for regulation of output power at the second output node, wherein the controller is configured to control the first switched-mode main regulator to (i) selectively allow energy to flow from the input node (a) to the first and second output nodes or (b) to the first and second supplemental energy storage elements and (ii) selectively allow energy to flow from the first supplemental energy storage element to the first output node via the first supplemental regulator, where the second output node and the second supplemental energy storage element are poled oppositely from the first output node and the first supplemental energy storage element.

17. The power converter of claim 16, wherein the first switched-mode main regulator comprises:
the first main inductive element connected to the input node;
the first main energy gating element connected to the main inductive element, and controlled by the controller;
the second main energy gating element coupled to the main inductive element and to the first output node, and controlled by the controller;
a third main energy gating element coupled to the main inductive element and to the second output node, and controlled by the controller;
a fourth main energy gating element coupled to the main inductive element and to the second energy storage element, and controlled by the controller; and
the first supplemental energy gating element coupled to the first main inductive element and to the first energy storage element, and controlled by the controller, wherein the controller is configured to selectively control states of the first, second, third, fourth, and supplemental energy gating elements, such that:
a specified amount of energy is loaded into the first main inductive element via the first main energy gating element, then
energy in the first main inductive element is transferred (i) to the first output node via the second main energy gating element, (ii) to the second output node via the third main energy gating element, and (iii) to the second energy storage element via the fourth main energy gating element, then any remaining energy in the first main inductive element is transferred to the first supplemental energy storage element via the first supplemental energy gating element.

18. The power converter of claim 16, further comprising one or more additional output nodes.

19. The power converter of claim 1, further comprising:
a second supplemental energy storage element; and
a second supplemental regulator to contribute negatively poled supplemental energy for the regulation of the output power at the first output node, wherein the controller is configured to control the first switched-mode main regulator to (i) selectively allow energy of either polarity to flow from the input node to the first output node, (ii) selectively allow positively poled energy to flow to the first supplemental energy storage element, and (iii) selectively allow negatively poled energy to flow to the second supplemental energy storage element, such that the first output node may be at either a positive or negative voltage level.

20. The power converter of claim 19, wherein the first switched-mode main regulator comprises:
the first main inductive element connected to the input node;
at least the first main energy gating element connected to the first main inductive element and controlled by the controller;
the second main energy gating element coupled to the first main inductive element and to the first output node and controlled by the controller;
a third main energy gating element coupled to the first main inductive element and to the first output node and controlled by the controller; and
a fourth main energy gating element coupled to the first main inductive element and to the second supplemental energy storage element and controlled by the controller, wherein the controller is configured to selectively control states of the first, second, third, and fourth main energy gating elements such that:
a specified amount of energy is loaded into the first main inductive element via the first main energy gating element, then
negatively poled energy in the first main inductive element is selectively transferred (i) to the first output node via the third main energy gating element and (ii) to the second supplemental energy storage element via the fourth main energy gating element,
positively poled energy in the first main inductive element is selectively transferred (i) to the first output node via the second main energy gating element, and
any remaining energy in the first main inductive element is transferred to the first supplemental energy storage element via the first supplemental energy gating element.

21. The power converter of claim 1, wherein the first switched-mode main regulator is a forward converter.

22. The power converter of claim 21, wherein the first supplemental regulator provides bidirectional regulation of the first output node.

23. The power converter of claim 21, wherein the first switched-mode main regulator comprises:
the first main inductive element connected to the input node;
the first main energy gating element connected to the first main inductive element and controlled by the controller;
the second main energy gating element coupled to the first main inductive element and to the first output node and controlled by the controller; and
a second main inductive element coupled to the second main energy gating element and to the first output node, wherein the controller is configured to selectively control states of the first and second main energy gating elements such that:
input energy can be transferred to the first main inductive element by action of the first main energy gating element;
energy held in the first main inductive element can be selectively transferred to the first output node via the second main energy gating element; and
energy held in the first main inductive element can be selectively transferred to the first supplemental energy storage element via the supplemental energy gating device.

24. The power converter of claim 23, wherein:
the first main inductive element is part of a transformer;
the second main inductive element is a simple inductor;
the first main energy gating element is a first switch;
the second main energy gating element is a second switch;
the first supplemental energy storage element is a second capacitor; and
the first supplemental energy gating element is a diode or switch.

25. The power converter of claim 21, wherein the second main inductive element is part of both a main regulating function of the first switched-mode main regulator and a supplemental regulating function of the first supplemental regulator.

26. The power converter of claim 21, wherein:
the first main energy gating element is controlled to be in a conducting state for a specific time in order to achieve zero voltage switching; and
the total energy transferred by the power converter is controlled by the frequency of operation of the first main energy gating element.

27. The power converter of claim 21, wherein:
AC rectification is provided; and
the first supplemental energy storage element supplies hold-over energy to the first output node via the first supplemental regulator while the first switched-mode main regulator is admitting input current into the first main inductive element in proportion to an AC input voltage applied at the input node for Power Factor Correction.

28. The power converter of claim 1, wherein the first switched-mode main regulator is a buck converter.

29. The power converter of claim 28, wherein:
the first switched-mode main regulator and the first supplemental regulator collectively comprise:
the first main inductive element connected to the input node;
the first main energy gating element connected to the first main inductive element and to the first input node and controlled by the controller;
a diode or switch connected to the junction of the first main energy gating element and the main inductive element; and
the second main energy gating element connected to the first main inductive element and to the first output node and controlled by the controller;
the first supplemental energy gating element is connected to the first main inductive element and to the first supplemental energy storage element;

the power converter further comprises a second supplemental energy gating element connected to the first main inductive element and controlled by the controller;

the first supplemental energy storage element is connected to the first and second supplemental energy gating elements, wherein the controller is configured to selectively control states of the energy gating elements such that:

when (i) the second main energy gating element is closed and (ii) the second supplemental energy gating element is opened, the first main energy gating element is controlled as a buck converter to transfer power from the input node to the first output node via the first main inductive element;

when the second main energy gating element is open while current is flowing in the first main inductive element, inductive energy is transferred to the first supplemental energy storage element via the first supplemental energy gating element; and when (i) the first main energy gating element is opened and (ii) the second main energy gating element is closed, the second supplemental energy gating element can be selectively controlled to transfer power from the first supplemental energy storage element to the first output node.

30. The power converter of 29, wherein the first main energy gating element is controlled so that the energy held in the first supplemental energy storage element remains within a specified range.

31. The power converter of claim 28, wherein the first main inductive element is part of both the switched-mode main regulator and the first supplemental regulator.

32. A method of controlling a power converter comprising the steps of:
(a) energizing a switched inductor of a switched-mode main regulator of the power converter with a first amount of energy;
(b) actively controlling the switched-mode main regulator to transfer a portion of the first amount of energy from the switched inductor to an output node during at least one part of a control cycle of the switched-mode main regulator during which energy does not flow from the switched inductor to an energy storage element, if required for regulation;
(c) actively controlling the switched-mode main regulator to transfer an other portion of the first amount of energy from the switched inductor to the energy storage element via a supplemental energy gating element of the power converter during at least another part of the control cycle of the switched-mode main regulator during which energy does not flow from the switched inductor to the output node, wherein at least one of (i) the portion of the first amount of energy that is transferred from the switched inductor to the output node and (ii) the other portion of the first amount of energy that is transferred from the switched inductor to the energy storage element is actively controlled; and
(d) actively controlling the switched-mode main regulator to provide energy from the energy storage element to the output node via a supplemental regulator of the power converter during the control cycle of the switched-mode main regulator, if required for output regulation, such that a desired amount of energy is transferred to the output node during any one control cycle of the switched-mode main regulator.

33. The method of claim 32, wherein the energy storage element supplies hold-over energy to the output node via the supplemental regulator of the power converter while the switched-mode main regulator of the power converter is admitting input current into the switched inductor in proportion to an AC input voltage applied at an input node of the power converter so as to perform Power Factor Correction.

34. The method of claim 32, wherein:
an average amount of power converted by the power converter is controlled to cause the amount of energy held in the first energy storage element to remain within a specified range;
step (a) comprises energizing the switched inductor of the switched-mode main regulator with the first amount of energy during a first part of the control cycle of the switched-mode main regulator;
step (b) comprises transferring the portion of the first amount of energy from the switched inductor to the output node during a second part of the control cycle;
step (c) comprises transferring the other portion of the first amount of energy from the switched inductor to the energy storage element via the supplemental energy gating element during a third part of the control cycle; and
step (d) comprises providing the energy from the energy storage element to the output node via the supplemental regulator of the power converter, such that the desired amount of energy is transferred to the output node during any one control cycle of the switched-mode main regulator.

* * * * *